United States Patent [19]

Brule et al.

[11] Patent Number: 4,497,726

[45] Date of Patent: Feb. 5, 1985

[54] ELECTRODE MATERIAL

[75] Inventors: James E. Brule, South Windsor; James K. O'Neill; David N. Palmer, both of Tolland, all of Conn.

[73] Assignee: Combustion Engineering, Inc., Windsor, Conn.

[21] Appl. No.: 499,234

[22] Filed: May 31, 1983

[51] Int. Cl.³ ............................................. H01M 4/88
[52] U.S. Cl. ............................... 252/182.1; 429/191; 429/194; 429/218; 429/220
[58] Field of Search ..................... 252/182.1; 429/191, 429/194, 218, 220

[56] References Cited

U.S. PATENT DOCUMENTS 4,206,276  6/1980  Basu et al. .......................... 252/182.1
4,357,215  11/1982 Goodenough .................... 252/182.1
4,430,315  2/1984  Caldwell ............................. 423/499

OTHER PUBLICATIONS

C. Fouassier et al., "On the New Oxygenated Bronzes of the Formula $Na_xCoO_2(x\leq)$ . . . Sodium System", J. Solid State Chem., 6, pp. 532, et seq., (1973).

C. Delmas et al., "The Bronzes of Cobalt $K_xCoO_2(x<)$. The Oxide $KCoO_2$", J. Solid State Chem., 13, pp. 165 et seq., (1975).

C. Fouassier et al., "Structural Evolution and Physical Properties of the Phases $A_xMO_2$(A=Na,K; M=Cr, Mn, Co)$x\leq 1$", Mat. Res. Bull., vol. 10, pp. 443 et seq., (1975).

C. Delmas et al., "The Relative Stability of Octahedric . . . of the Form $A_xMO_2$", Mat. Res. Bull., vol. 11, pp. 1483–1488, (1976).

K. Mizushima et al., "$Li_xCoO_2$ ($0<x\leq 1$): A New Cathode Material for Batteries of High Energy Density", Mat. Res. Bull., vol. 15, pp. 783–789, (1980).

J. J. Braconnier et al., "Electrochemical Behavior of the Phases of $Na_xCoO_2$", Mat. Res. Bull., vol. 15, pp. 1797–1804, (1980).

*Primary Examiner*—Leland A. Sebastian
*Attorney, Agent, or Firm*—Brumbaugh, Graves, Donohue & Raymond

[57] ABSTRACT

A cathode active material, which is especially useful as the cathode in a lithium high energy density nonaqueous cell operating on the principle of intercalation, has the general formula $Li_xM_yM'_zO_{2-n}F_n$ where M is selected from the group consisting of metallic ions having a valence of +1 other than lithium and metallic radicals having a valence of +1; M' is selected from the group consisting of Fe, Co and Ni; x is 0.01 to 0.99 and y is 0.99 to 0.01, respectively; z is 0.8 to 1.2; and n is zero to 0.1.

14 Claims, No Drawings

ELECTRODE MATERIAL

The present invention relates to an electrode material and more particularly to a cathode active material which is especially useful as the cathode in a lithium high energy density nonaqueous cell operating on the principle of intercalation.

Layered or lamellar transition metal chalcogenides are well known to be useful as the cathode active material for lithium nonaqueous secondary batteries or cells which operate upon the principle of intercalation. Typical examples of such materials and such batteries are those disclosed, for example, in U.S. Pat. Nos. 4,009,052; 4,049,879; 4,049,887; 4,198,476; 4,206,276; 4,207,245; 4,228,226; and 4,233,377.

It has been proposed heretofore (Mat. Res. Bull., Vol. 15, pp. 783–789, 1980) to construct a nonaqueous cell with a lithium metal anode and a $LiCoO_2$ cathode. However, such a cell would have limited reversibility, because of apparent collapse of the $LiCoO_2$ structure upon removal of Li from the unit cell. In addition, a charge imbalance would occur causing phase transitions to develop during early or later cycle life.

It has also been proposed heretofore (Mat. Res. Bull. Vol. 15 pp. 1797–1804, 1980) that a reversible $NaCoO_2$ cell can be fabricated and operated as a secondary cell versus a Na anode without structural damage. The $Na_yCoO_2$ structure is most stable when y is between 1.0 and 0.5.

Because the $NaCoO_2$ is structurally more stable than the $LiCoO_2$ structure, it was postulated as part of the present invention [Li being isoelectronic with sodium and having an atomic crystal radius not that drastically different from Na (0.68 Å versus 0.97 Å)] that a stable $Li_xNa_yCoO_2$ molecule (where $x=0.01-0.99$ and $y=0.99-0.01$ dependent on the relative ion concentration of Li vs. Na) could be synthesized which could function as a cathode either in a reversible secondary cell versus a Li anode or in a concentration cell versus an anode formed of a lithiated intercalation compound.

The same circumstance holds for other bronzes (e.g., $NaFeO_2$, $NaNiO_2$, or $NaCuO_2$, etc.). The most stable circumstance in the case of a $Li_xNa_yCoO_2$ would be $x=0.01-0.5$ and $y=0.5$ where after Li removal the Na bronze would be electrochemical stable at relatively high voltages (2.5–3.5 V), e.g.,

$$Li_{0.5}Na_{0.5}CoO_2 \rightarrow Na_{0.5}CoO_2 + 0.50\ Li$$

By analogy to $Li_xCoO_2$, $Na_{0.5}CoO_2$ is stable while $Li_{0.5}CoO_2$ will undergo structural collapse and decompose when x is less than or equal to 0.5.

The object of the present invention is to provide a cathode active material which is a stabilized form of $LiMCoO_2$ usable either in a reversible secondary cell versus a lithium metal anode or in a concentration cell versus an anode formed of a lithiated intercalation compound.

The cathode active material of the present invention has the general formula $Li_xM_yM'_zO_{2-n}F_n$ where M is selected from the group consisting of metallic ions having a valence of +1 other than lithium and metallic radicals having a valence of +1; M' is selected from the group consisting of Fe, Co and Ni; x is 0.01 to 0.99 and y is 0.99 to 0.01, respectively; z is 0.8 to 1.2; and n is zero to 0.1.

Thus in the above general formula M can be a metallic ion of a Group 1a metal of the Periodic Table of Elements other than lithium, namely, $Na^+$, $K^+$, $Rb^+$, $Cs^+$ and $Fr^+$. A typical representative example of such a cathode active material is $Li_{0.5}Na_{0.5}CoO_2$.

Furthermore, in the above general formula M can be a metallic ion of a Group 1b metal of the Periodic Table of Elements, namely, $Cu^+$, $Ag^+$ and $Au^+$. A typical representative example of such a cathode active material is $Li_{0.5}Cu_{0.5}CoO_2$.

In the above general formula M can also be the metallic ions $Hg^+$ or $Tl^+$.

In addition, in the above general formula M can be a metallic hydroxyl radical of a Group 2a metal of the Periodic Table of Elements, namely, $(BeOH)^+$, $(MgOH)^+$, $(CaOH)^+$, $(SrOH)^+$ and $(BaOH)^+$. A typical representative example of such a cathode active material is $Li_{0.5}(MgOH)_{0.5}CoO_2$.

Also in the above general formula M can be a metallic halogeno (fluoro, chloro, bromo or iodo) radical of a Group 2a metal of the Periodic Table of Elements. Thus, M can be a metallic fluoro radical of a Group 2a metal of the Periodic Table of Elements, namely $(BeF)^+$, $(MgF)^+$, $(CaF)^+$, $(SrF)^+$ and $(BaF)^+$. M can also be a metallic chloro radical of a Group 2a metal of the Periodic Table of Elements, namely, $(BeCl)^+$, $(MgCl)^+$, $(CaCl)^+$, $(SrCl)^+$ and $(BaCl)^+$. Typical representative examples of these cathode active materials are $Li_{0.5}(MgF)_{0.5}CoO_2$ and $Li_{0.5}(MgCl)_{0.5}CoO_2$.

The particular species of cathode active materials of the present invention having the above general formula and wherein n is other than zero (i.e., those materials containing a fluorine (F) atom) have greatly increased solid state conductivity or lowered internal resistance compared with the remaining materials wherein n is zero (i.e., those materials not containing a fluorine atom). A typical representative example of such an F-containing cathode active material is $Li_{0.5}Na_{0.5}CoO_{1.9}F_{0.1}$.

The cathode active materials of the present invention can be used as the cathode in a nonaqueous cell having a lithium metal or LiAl alloy anode and a soluble lithium salt (e.g., $LiClO_4$, $LiBF_4$ or $LiAsF_6$) as the electrolyte in an aprotic solvent (e.g., sulfolane and methyl sulfolane). Such cells generally have a voltage greater than 3.5 volts.

The cathode active materials of the present invention can also be used as the cathode in a nonaqueous concentration cell having an intercalated lithium anode and a soluble lithium salt (e.g., $LiAsF_6$ or $LiBF_4$) as the electrolyte in an aprotic solvent (e.g., propylene carbonate, butyrolactone, sulfolane or sulfolane and methyl sulfolane). The intercalated lithium anode material can be, for example, $Li_xMoS_3$ where x is 0.17 to 3.8; $Li_xV_2S_5$ where x is 1.0 to 5.0; $Li_xV_6O_{13+y}$ where x is 1.0 to 5.4 and y is zero to 0.6; and $Li_xV_6O_{13-y}$ where x is 1.0 to 5.4 and y is zero to 0.5.

The materials of the present invention can further be used in gaseous recombination or gaseous liquid fuel cell electrodes or electrodes for photoelectrochemical or photogalvanic cells.

The cathode active materials of the present invention can be synthesized in accordance with the various procedures set forth in the representative Examples 1–5 thereof given below and can be utilized in cells as shown by representative Examples 6–8 below.

EXAMPLE 1

Step 1—Formation of NaCoO$_2$

Na$_2$O+CoO or Na$_2$CO$_3$+CoCO$_3$ or Na$_2$O$_2$+Co$_3$O$_4$ are mixed by pelletizing and reacted in air at 900° C. for 24 hours to yield NaCoO$_2$ bronze. After the 24 hour period the pelletized mixture is slowly cooled to room temperature.

Step 2—Formation of Li$_{0.5}$Na$_{0.5}$CoO$_2$ (a) Method No. 1

The NaCoO$_2$ bronze is refluxed in a LiCl solution in methanol at 64° C. for a sufficient time (e.g., 48 hours) to yield a Li$_{0.5}$Na$_{0.5}$CoO$_2$ by assay.

(b) Method No. 2

The NaCoO$_2$ bronze is melt-reacted in a solution of a low melting Li salt, such as LiNO$_3$ (m.p.=264° C.), for 48 hours minimum, to yield a Li$_{0.5}$Na$_{0.5}$CoO$_2$ by assay.

(c) Method No. 3

(1) The NaCoO$_2$ bronze is partially deintercalated with a Na anode with a discharge to approximately 50% depth of discharge to remove 50% of the Na from the NaCoO$_2$ lattice.

(2) The substoichiometric in Na Na$_{0.5}$CoO$_2$ material is placed as the cathode in a cell containing a Li anode and the Li is intercalated into the substoichiometric sodium bronze yielding an end product of Li$_{0.5}$Na$_{0.5}$CoO$_2$.

EXAMPLE 2

Step 1—Formation of CuCoO$_2$

Cu$_2$O+CoO or Cu$_2$Co$_3$+CoCO$_3$ are mixed by pelletizing and reacted in a 90% argon +10% oxygen mixture at 900° C. for 24 hours to yield CuCoO$_2$ bronze. After the 24 hour period the pelletized mixture is slowly cooled to room temperature.

Step 2—Formation of Li$_{0.5}$Cu$_{0.5}$CoO$_2$ (a) Method No. 1

The CuCoO$_2$ bronze is refluxed in a LiCl/acetone mixture (H$_2$O free) at 64° C. for a sufficient time (e.g., 10-30 hours) to yield a Li$_{0.5}$Cu$_{0.5}$CoO$_2$ by assay.

(b) Method No. 2

The CuCoO$_2$ bronze is melt-reacted in a solution of a low melting Li salt, such as LiOH (mp=450° C.) or LiC$_{12}$H$_{23}$O$_2$ (mp+230° C.), for 48 hours or less to yield a Li$_{0.5}$Cu$_{0.5}$CoO$_2$ by assay. This reaction may be conducted under an Argon blanket.

(c) Method No. 3

(1) The CuCoO$_2$ bronze is partially deintercalated with a Cu anode with a discharge to approximately 50% depth of discharge or discharged to a level that will remove 50% of the Cu from the CuCoO$_2$ lattice as verified by assay.

(2) The substoichiometric in Cu Cu$_{0.5}$CoO$_2$ material is placed as the cathode in a cell containing a Li anode and the Li is intercalated into the substoichiometric copper bronze yielding an end product of Li$_{0.5}$Cu$_{0.5}$CoO$_2$.

EXAMPLE 3

Step 1—Formation of Mg(OH)CoO$_2$

A mixture of 0.5 moles of MgCO$_3$.Mg(OH)$_2$.3H$_2$O plus 0.5 moles of MgC$_2$O$_4$.2H$_2$O or 0.5 moles of MgCO$_3$.Mg(OH)$_2$.3H$_2$O plus 0.5 moles of MgCO$_3$.3-H$_2$O is mixed with one mole of either CoO or Co$_3$O$_4$ by pelletizing and reacted at 700° C.-900° C. in air for a sufficient time (e.g., 24-48 hours) to yield a (MgOH)-CoO$_2$ bronze by assay.

Step 2—Formation of Li$_{0.5}$(MgOH)$_{0.5}$CoO$_2$

The (MgOH)CoO$_2$ bronze is refluxed in a LiCl solution in methanol at 64° C. for a sufficient time (e.g., 20-26 hours) to yield a Li$_{0.5}$(MgOH)$_{0.5}$CoO$_2$ by assay.

EXAMPLE 4

Step 1—Formation of (MgF)CoO$_2$

The formation of (MgF)CoO$_2$ is a two step process under the following conditions:

Process a $$2MgSiF_4 + Cl_2 + 2SiO_2 \xrightarrow[750 \text{ mm Hg}]{100° C.} 2(MgOF)SiO_2 + SiCl_2F_2 + SiF_4$$

Process b

The Product (MgOF)SiO$_2$ (one mole) is mixed with one mole of CoO and reacted in air or argon at 900° C. for 24 hours to yield the following:

$$(MgOF)SiO_2 + CoO \rightarrow (MgF)CoO_2 + SiO_2$$

Step 2—Formation of Li$_{0.5}$(MgF)$_{0.5}$CoO$_2$

The (MgF)CoO$_2$ compound is refluxed in a solution of 90% LiCl+10% LiF in dioxolane at 64° C. for 24 hours to yield a Li$_{0.5}$(MgF)$_{0.5}$CoO$_2$ by assay.

EXAMPLE 5

Step 1—Formation of NaCoO$_{2-n}$F$_n$ (e.g., NaCoO$_{1.9}$F$_{0.1}$)

The NaCoO$_2$ bronze produced in Example 1, Step 1, is treated by either of the following reactions:

Reaction (a)

$$NaCoO_2 \xrightarrow[\substack{H_2O \\ 102° C.}]{HF} NaCoO_{2-n}F_n$$

where n ranges from 0.01 to 0.1 depending on the time of exposure to the above conditions, e.g., n=0.1 after 12 hours under a flowing gas stream where the HF inventory in the stream is 1% to 10% by volume (fluidized bed conditions).

Reaction (b)

$$NaCoO_2 \xrightarrow[\substack{\text{Argon at} \\ 135° C.}]{1-10\% \text{ HF}} NaCoO_{2-n}F_n$$

where n ranges from 0.01 to 0.1 depending on the time of exposure to the above conditions, e.g., n=0.1 after 20 hours under a flowing gas stream of the indicated HF (10% by volume) in argon (90% by volume) (fluidized bed conditions).

Step 2—Formation of Li$_{0.5}$Na$_{0.5}$CoO$_{2-n}$F$_n$ (e.g., Li$_{0.5}$Na$_{0.5}$CoO$_{1.9}$F$_{0.1}$)

The NaCoO$_{2-n}$F$_n$ compound produced by either Reaction (a) or (b) above is configured as a cathode versus a Na metal anode in a nonaqueous electrolyte medium using a suitable sodium salt (e.g., NaBF$_4$) in propylene carbonate (less than 10 ppm H₂O). The cell is charged from OCV (open current voltage) as assembled to a voltage representing the reaction: (e.g., 2.5-3.1 V)

$$NaCoO_{2-n}F_n \rightarrow Na_{0.5}CoO_{2-n}F_n \qquad (5)$$

After this condition is met, the $Na_{0.5}CoO_{2-n}F_n$ material is configured as a cathode versus a Li metal anode in a nonaqueous electrolyte medium using a suitable lithium salt (e.g., $LiBF_4$) in propylene carbonate and discharged from the as assembled OCV (~2.5-3.1 V) to a voltage representing the reaction (e.g., 2.5-3.1 V to 2.0 V)

$$Na_{0.5}CoO_{2-n}F_n \xrightarrow[\text{discharge}]{Li} Li_{0.5}Na_{0.5}CoO_{2-n}F_n$$

EXAMPLE 6

A Li/Li₀.₅Na₀.₅CoO₂ Cell $Li_{0.5}Na_{0.5}CoO_2$ is mixed with a suitable amount of Vulcan X72C carbon black to yield a mixture with a volume resistivity of $1 \times 10^1$ ohm-cm and mixed with a sufficient amount of an ethylene-propylene rubber gum stock in toluene to form a coherent coating on a 304 stainless steel foam or screen with a cathode active mass of 60 mgs.

The coated cathode is placed in a suitable electrochemical cell with a Li metal or LiAl alloy metal electrode (anode) using either a 1M $LiAsF_6$+(90% sulfolane+10% methyl sulfolane) or 1M $LiBF_4$+(90% sulfolane+10% methyl sulfolane) as an electrolyte mixture.

The cell under this condition will have an OCV=~3.0 volts, an IR=~8 ohm and will be in the discharged state assembled in the above configuration.

This cell can be cycled as a secondary cell for at least fifty cycles as follows with no apparent collapse of the structure:
(e.g., $LiCoO_2 \rightarrow Li_2O + CoO$)
First Half Cycle
(charge) $Li_{0.5}Na_{0.5}CoO_2 \rightarrow Na_{0.5}CoO_2 + 0.5Li$ at OCV (assembled)=LSV=3.0-2.8 volts
HSV=3.8 volts
charge/discharge time=~1000 seconds at 1 mA/cm²
First Full Cycle
(a) discharge $Na_{0.5}CoO_2 + 0.5Li \rightarrow Li_{0.5}Na_{0.5}CoO_2$
HSV=3.8 volts
LSV=2.8 volts
discharge time=~980 seconds at 1 mA/cm²
(b) charge (repeat of first half cycle) 2-50th full cycles (repeat of first full cycle)

EXAMPLE 7

A MoS₃/Li₀.₅Na₀.₅CoO₂ Cell

The $Li_{0.5}Na_{0.5}CoO_2$ cathode is prepared as in Example 6. An anode containing $MoS_3$ is prepared as in Example 6. Both the anode and the cathode are configured in the electrolyte solution defined in Example 6. The cell in this configuration will be in the discharged state ready for charging as follows: (Note mole ratios)
First Half Cycle (charge) $3.4Li_{0.5}Na_{0.5}CoO_2 + MoS_3 \rightarrow Li_{0.17}MoS_3 + Na_{0.5}CoO_2$
OCV=LSV=0.4 volts discharged
HSV=1.8 volts after charge, ~1000 seconds at ~1 mA/cm²
First Full Cycle
(a) discharge $Li_{0.17}MoS_3 + Na_{0.5}CoO_2 \rightarrow 3.4Li_{0.5}Na_{0.5}CoO_2 + MoS_3$
(b) charge (repeat of first half cycle)

This cell can cycle for at least 50 cycles with no apparent collapse of the anode or cathode active material.

EXAMPLE 8

A Li/Li₀.₅Na₀.₅CoO₁.₉F₀.₁ Cell

This cell is prepared as in Example 6 except for the difference in the cathodes.

The results for Examples 6 and 8 are equivalent other than the following measured characteristics: $Li_{0.5}Na_{0.5}CoO_{1.9}F_{0.1}$
Volume resistivity=~5 ohm-cm
In cell IR (compare Example 6)=~1 ohm

What is claimed is:
1. A cathode active material having the general formula $Li_xM_yM'_zO_{2-n}F_n$ wherein M is selected from the group consisting of metallic ions having a valence of +1 other than lithium and metallic radicals having a valence of +1; M' is selected from the group consisting of Fe, Co and Ni; x is 0.01 to 0.99 and y is 0.99 to 0.01, respectively; z is 0.8 to 1.2; and n is zero to 0.1.

2. A cathode active material according to claim 1, wherein M is a metallic ion of a Group 1a metal of the Periodic Table of Elements other than lithium.

3. A cathode active material according to claim 1, wherein M is a metallic ion of a Group 1b Metal of the Periodic Table of Elements.

4. A cathode active material according to claim 1, wherein M is Hg⁺.

5. A cathode active material according to claim 1, wherein M is Tl⁺.

6. A cathode active material according to claim 1, wherein M is a metallic hydroxyl radical of a Group 2a metal of the Periodic Table of Elements.

7. A cathode active material according to claim 1, wherein M is a metallic halogeno radical of a Group 2a metal of the Periodic Table of Elements.

8. A cathode active material according to claim 7, wherein M is a metallic fluoro radical of a Group 2a metal of the Periodic Table of Elements.

9. A cathode active material according to claim 7, wherein M is a metallic chloro radical of a Group 2a metal of the Periodic Table of Elements.

10. A cathode active material according to claim 1 which is $Li_{0.5}Na_{0.5}CoO_2$.

11. A cathode active material according to claim 1 which is $Li_{0.5}Cu_{0.5}CoO_2$.

12. A cathode active material according to claim 1 which is $Li_{0.5}(MgOH)_{0.5}CoO_2$.

13. A cathode active material according to claim 1 which is $Li_{0.5}(MgF)_{0.5}CoO_2$.

14. A cathode active material according to claim 1 which is $Li_{0.5}Na_{0.5}CoO_{1.9}F_{0.1}$.

* * * * *